Aug. 15, 1950  S. J. ANGELOTTI  2,519,214
CHUCK FOR SCROLL SAWS
Filed Aug. 19, 1948  2 Sheets—Sheet 1
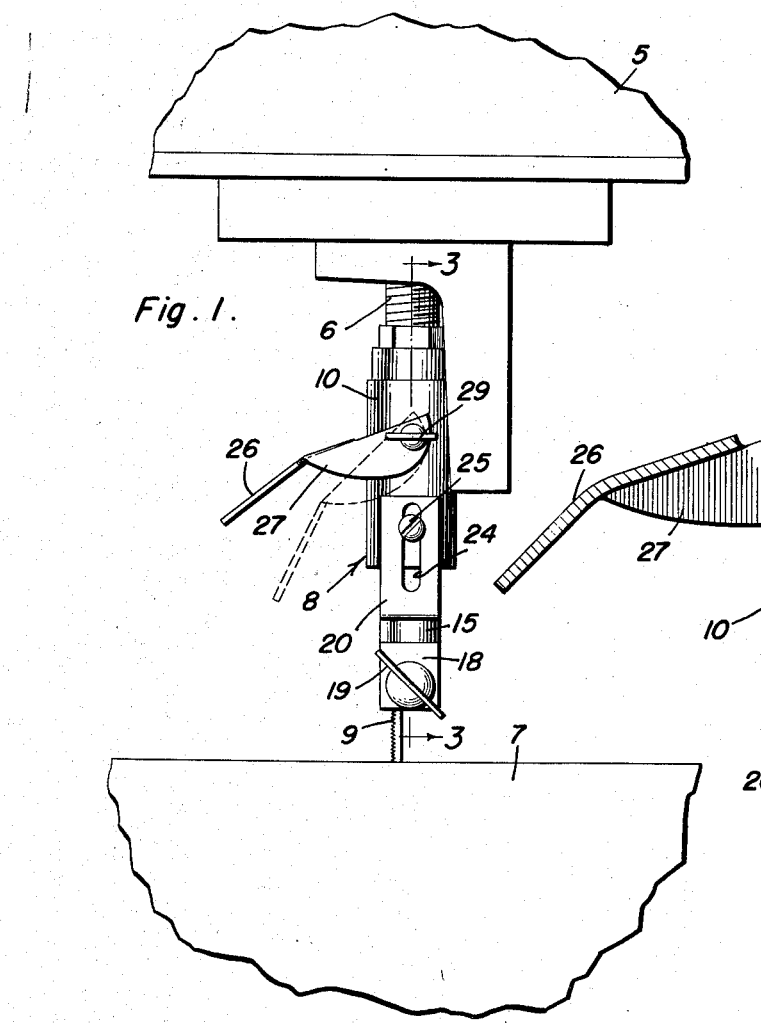
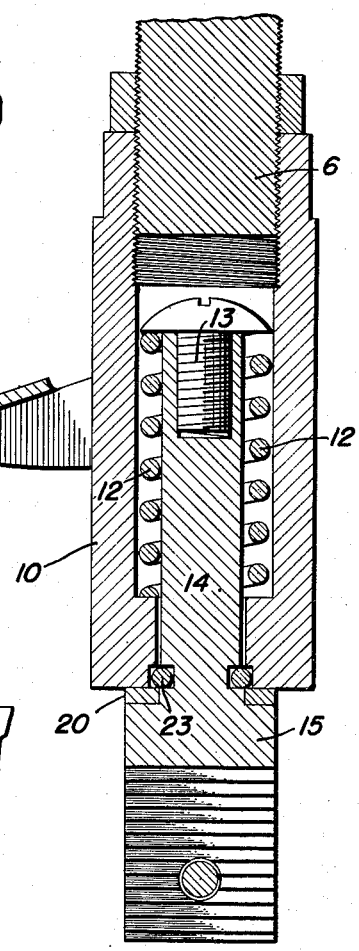
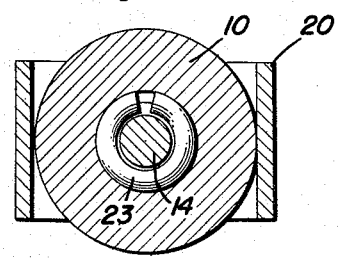
Silvio J. Angelotti
INVENTOR.
BY *Clarence A. O'Brien*
*and Harvey B. Jackson*
Attorneys Aug. 15, 1950  S. J. ANGELOTTI  2,519,214
CHUCK FOR SCROLL SAWS
Filed Aug. 19, 1948  2 Sheets-Sheet 2
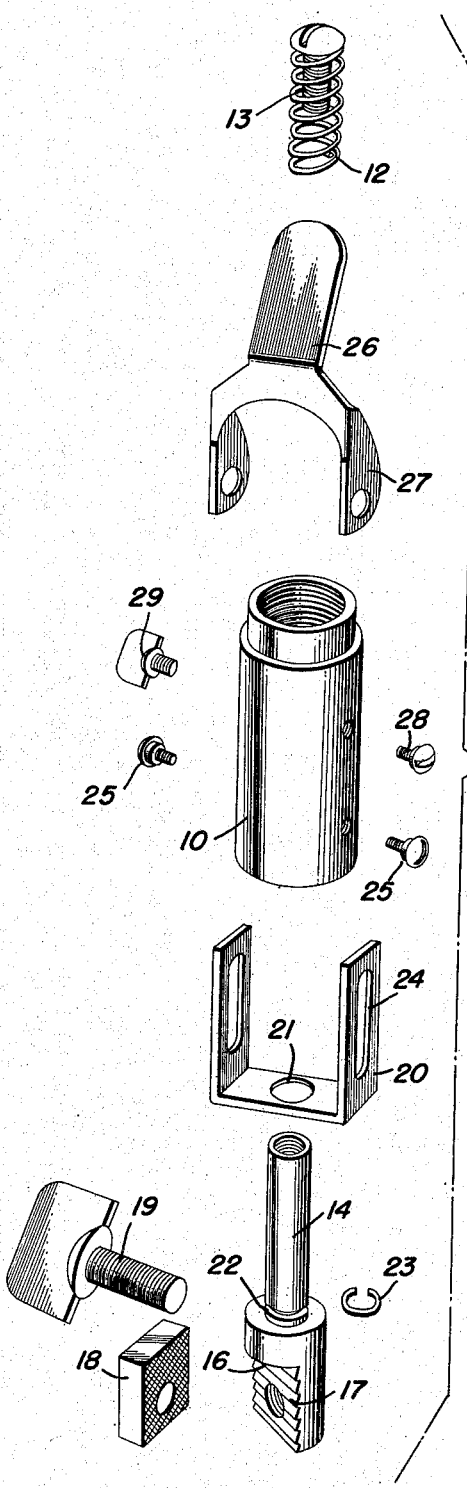
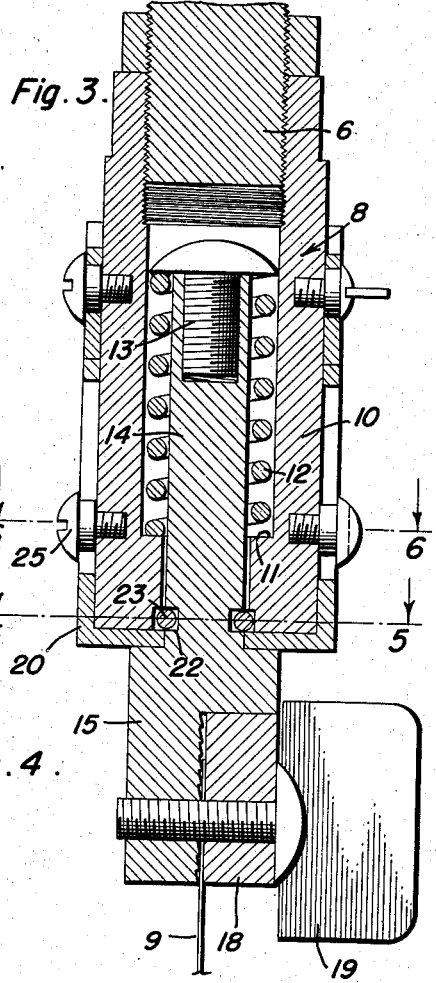
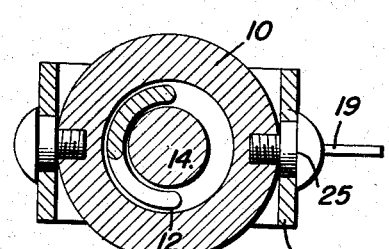
Silvio J. Angelotti
INVENTOR.

Patented Aug. 15, 1950

2,519,214

UNITED STATES PATENT OFFICE 2,519,214

CHUCK FOR SCROLL SAWS

Silvio J. Angelotti, Haverhill, Mass.

Application August 19, 1948, Serial No. 45,151

5 Claims. (Cl. 143—156)

The present invention relates to new and useful improvements in scroll saws and more particularly to a chuck for interchangeably attaching various types of saw blades to the scroll machine.

An important object of the invention is to provide a chuck for the saw blade and embodying shock absorbing or tension compensating means for the saw during its reciprocating action.

A further object of the invention is to provide lever means for lowering the saw engaging clamp of the chuck and holding the same in a convenient position to facilitate removal and replacement of the saw blade.

A still further object is to provide a saw chuck for scroll saws which may be easily and quickly attached in position without necessitating any changes or alterations in the construction of the machine.

A still further object is to provide an attachment of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the chuck in position on the saw machine;

Figure 2 is an enlarged vertical sectional view of the chuck;

Figure 3 is an enlarged vertical sectional view taken substantially on a line 3—3 of Figure 1;

Figure 4 is a group perspective view of the several parts of the chuck in disassembled position; and Figures 5 and 6 are transverse sectional views taken respectively on the lines 5—5 and 6—6 of Figure 3.

Referring now to the drawings in detail, wherein for the purpose of illustration I have disclosed a preferred embodiment of the invention, the numeral 5 designates a conventional type of jig saw or scroll saw of the walking beam type including a vertically reciprocating threaded rod 6 and a work table 7.

The chuck designated generally at 8 for attaching a saw blade 9 to the rod 6, comprises a sleeve 10 internally threaded at its upper end for attaching to the rod 6 and is formed with an internal shoulder 11 adjacent its lower end on which the lower end of a coil spring 12 is seated and with the upper end of the spring engaged under the head of a screw 13 threaded in the upper end of a stem 14 projecting upwardly through the lower end of the sleeve and having a clamping head 15 formed at its lower end. One side of the head 15 is rabbetted as shown at 16 to provide a flat vertical surface formed with horizontal teeth 17, and against which the upper end of the saw blade 9 is held by a clamping block 18 and a thumb screw 19 threaded through the block and the head 15 and passing through the upper end of the saw. A U-shaped slide 20 is formed with an opening 21 at its central portion for mounting on the stem 14 and is held in an annular groove 22 at the junction of the head 15 with the stem by means of a split resilient ring 23.

The slide 20 projects upwardly at diametrically opposite sides of the sleeve 10 and the sides of the slide are formed with vertical slots 24 for sliding on screws 25 threaded into the sides of the sleeve 10.

A yoke-shaped lever 26 is formed with cam elements 27 at its opposite side pivoted to the sleeve 10 above the slide 20 by means of a screw 28 at one side of the sleeve and a thumb screw 29 at a diametrically opposite side of the sleeve, the lever being mounted for vertical swinging movement and locked in an inactive position by the thumb nut 29.

In the operation of the device, the lever 26 is swung downwardly to move slide 20 and clamping head 15 downwardly against the tension of spring 12 to engage clamping head 15 with the upper end of saw 9 and which is then secured to the clamping head by plate 18 and thumb screw 19. The lever 26 is then raised to release slide 20 so that the blade is then held under tension of spring 12.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A chuck for attaching a saw blade to a reciprocating rod of a scroll saw and comprising a female member fixed to the rod, a male member working in the female member and to which a saw blade is attached, spring means holding the male member upwardly in the female member, a slide carried by the male member and positioned for vertical sliding movement outwardly of the female member, and means pivotally carried by the female member and engaging the slide to hold the male member downwardly against the tension of the spring.

2. The combination of claim 1, wherein a saw clamp is carried at the lower end of the male member.

3. A chuck for attaching a saw blade to a reciprocating rod of a scroll saw and comprising a female member fixed to the rod, a male member working in the female member and to which a saw blade is attached, spring means holding the male member upwardly in the female member, a slide carried by the male member and positioned for vertical sliding movement outwardly of the female member, and means pivotally carried by the female member and engaging the slide to hold the male member downwardly against the tension of the spring, said last-named means comprising a lever having camming engagement with said slide.

4. A chuck for attaching a saw blade to a reciprocating rod of a scroll saw comprising a pair of telescopic members one connected to said rod and the other movable outwardly of the rod connected member for attaching to the saw blade, means on said movable member for attaching the same to said blade, spring means between said members tensioning said movable member against outward movement to tension the saw blade when attached to the movable member, a U-shaped slide carried by the rod connected member in straddling relation thereto and engaging the movable member to move the same outwardly, and lever means carried by the rod connected member for engaging and sliding said slide.

5. A chuck according to claim 4 wherein said lever means includes a yoke shaped lever with cam sides pivoted on said rod connected member for camming engagement with the terminal ends of said slide.

SILVIO J. ANGELOTTI.

REFERENCES CITED

The following references are of record in the file of this patent:

UNITED STATES PATENTS

| Number | Name | Date |
|---|---|---|
| 104,613 | Mason | June 27, 1870 |